3,671,122
**METHODS OF PRINTING STEREOSCOPIC IN-
TEGRAL PHOTOGRAPH FROM PSEUDOSCOPIC
ORIGINAL**
Leslie Peter Dudley, Los Angeles, Calif., assignor to
Dudley Optical Laboratories, Inc., Beverly Hills, Calif.
Original application July 26, 1968, Ser. No. 747,996.
Divided and this application Oct. 2, 1970, Ser.
No. 77,606
Int. Cl. G03b 35/02
U.S. Cl. 355—22                   2 Claims

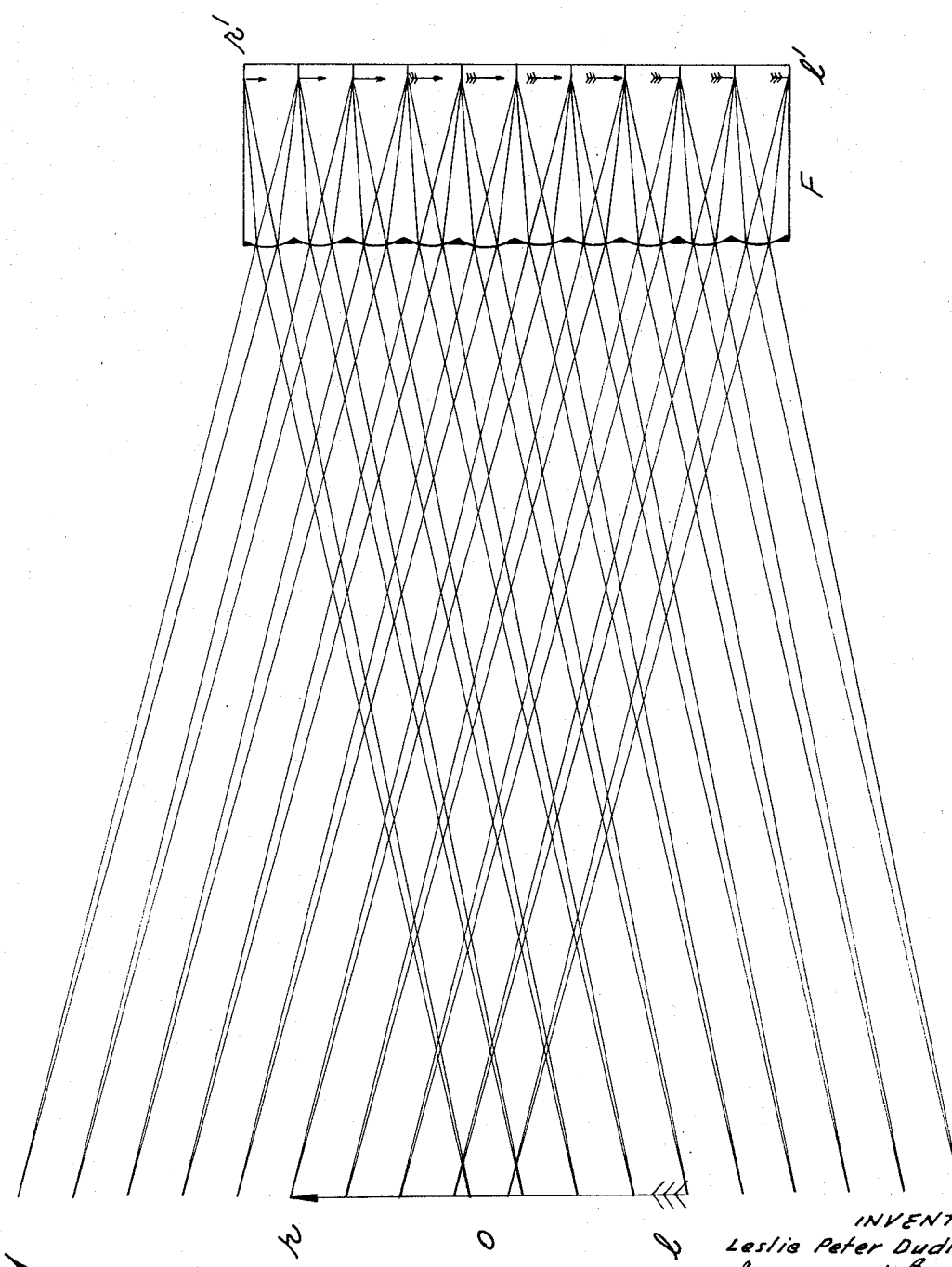

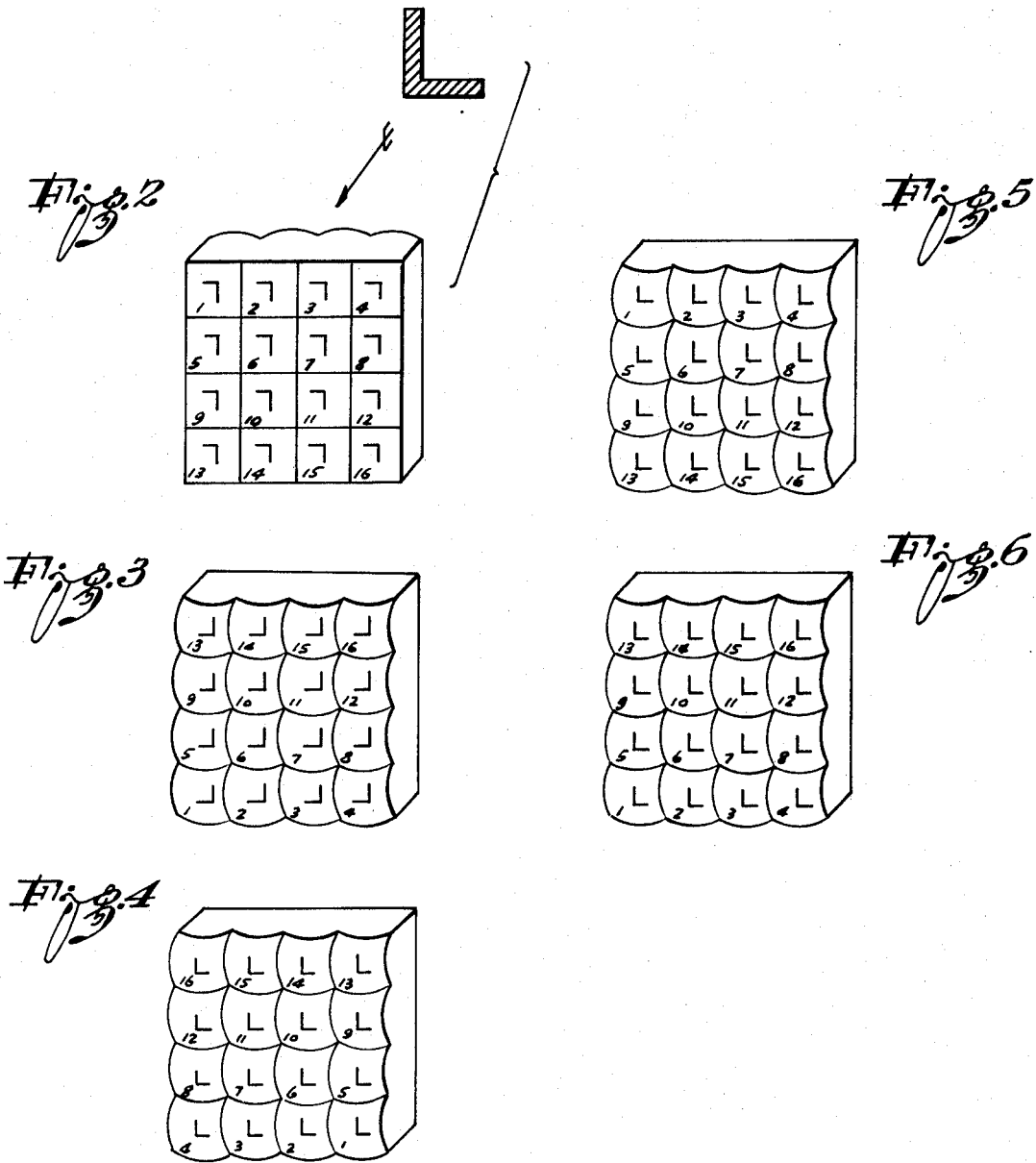

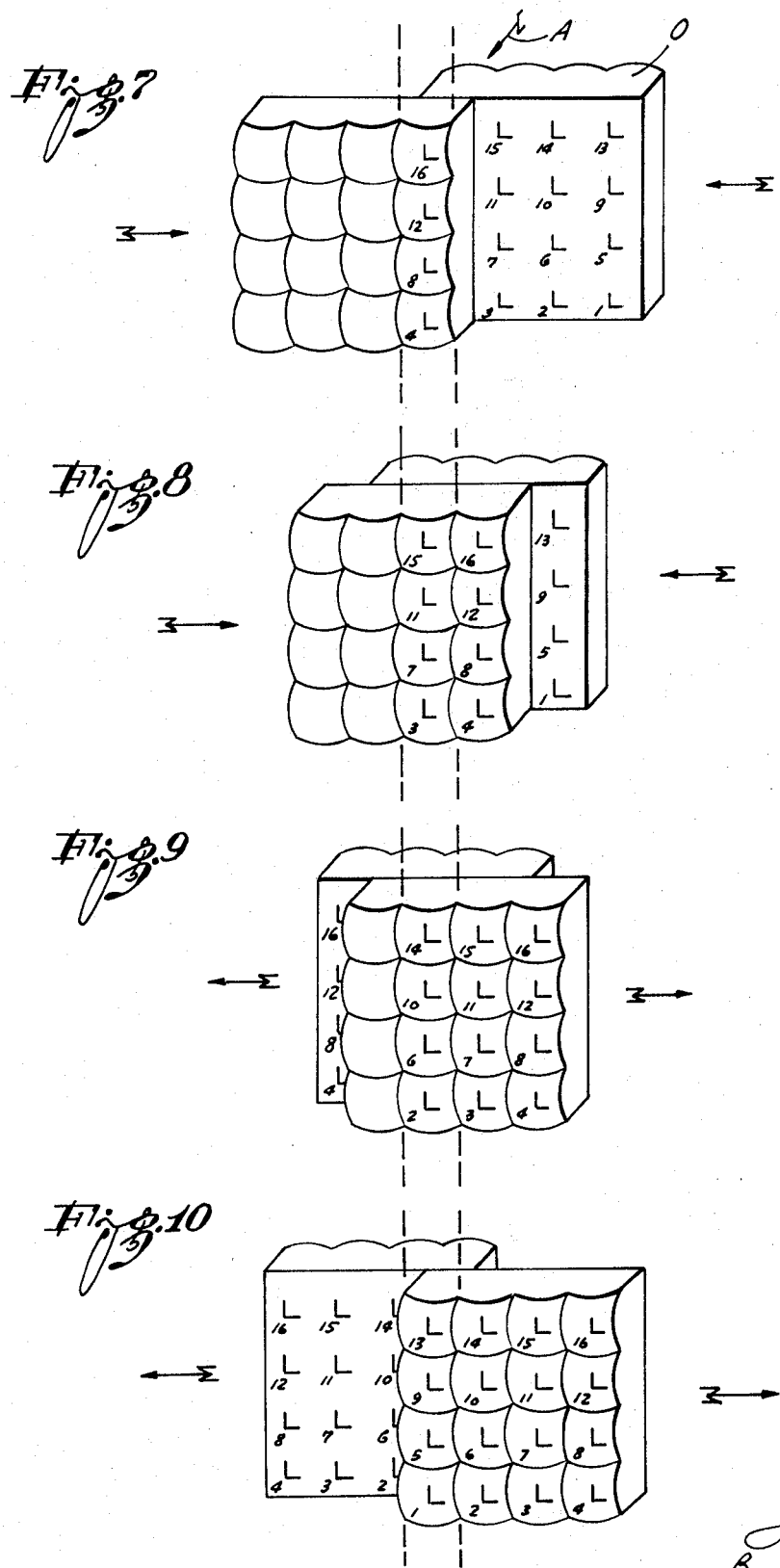

ABSTRACT OF THE DISCLOSURE

Photographs of the integral type are provided which exhibit the effect of parallax about both horizontal and vertical axes, the photographs being recorded on a spherically lenticulated film or on a spherically lenticulated screen-film combination; and a method, comprising a sequential printing technique, is provided by which the elementary images constituting the composite pictures are so transposed that a stereoscopic reproduction from a pseudoscopic integral photograph is achieved.

BACKGROUND OF THE INVENTION

This is a division of co-pending U.S. patent application Ser. No. 747,996 filed July 26, 1968.

The present invention is concerned with an improved system of stereoscopic or three-dimensional photography. A photograph produced in accordance with one or another of the methods described in this specification exhibits optical characteristics closely resembling those of a hologram. Thus, the aspect of the recorded three-dimensional image changes with change of viewpoint about both horizontal and vertical axes. However, the new type of photograph, which may be appropriately termed an integram or integraph, possesses several important advantages over the hologram. For example, coherent light (e.g., laser illumination) is not required in either taking or viewing the picture. Further advantages are: the photographic equipment employed is compact and simple to operate; exposure times correspond to those which would be required for ordinary two-dimensional photography under the same conditions; action shots and/or the use of flash present no more difficulty than with ordinary photography, and it is virtually impossible to produce an out-of-focus picture.

The photographic record constituting an integram consists of a large number of minute, juxtaposed images produced by an optical screen or reseau. The same—or a similar—screen is used when viewing the picture. In the preferred form the screen consists of transparent material embossed on one surface with an array of small lenticules of spherical or substantially spherical curvature. The screen is so located with respect to the photographic film emulsion or other photo-recording medium that the photo-recording surface is at the focus of the lenticules. A convenient arrangement is for the screen-film combination to be manufactured as a composite unit, the lenticules being formed on the surface of the film base opposite the surface carrying the photosensitive emulsion.

There are, basically, two alternative techniques either one or the other of which may be used for production of an integram; one of these techniques is termed direct integraphy, and the other is referred to as indirect integraphy. The present application is concerned with the direct method, the indirect method being described in my co-pending U.S. patent application Ser. No. 747,931, filed July 26, 1968, entitled "Improvements in Stereoscopic Photography." The method described herein resembles that disclosed by Gabriel Lippmann in 1908 (C. R. Académie des Sciences, vol. 146, pp. 446–51). That is to say, the lenticular film or screen-film combination is exposed direct without the use of a camera lens. The film is supported in a suitable camera body or holder during exposure. The exposure is controlled by the use of a filter or filters in front of the film and (or) by adjustment of the shutter speed, the shutter being preferably of the focal-plane type.

A minute image of the entire scene is recorded in the format of each lenticule, but the aspect of the scene represented by each such image is dependent upon the location of the associated lenticule with respect to the other lenticules in the array. Upon viewing the completed photograph, through the lenticular array, the eyes perceive the optical reconstitution or integration of the multiplicity of images which exhibits the form of a single three-dimensional image. The degree of parallax exhibited by the three-dimensional image, about the horizontal and vertical axes, is governed by the corresponding dimensions of the format of the screen-film combination. A photograph produced in the simple manner just indicated, as in the case of one produced in accordance with Lippmann's proposal, will be seen in pseudoscopic relief instead of stereoscopic relief. It is a feature of the present invention to provide means whereby this defect can be overcome so that the resulting picture exhibits stereoscopic relief and is correctly oriented. Other features of the invention will become apparent later in the specification.

NATURE OF THE LENTICULES AND METHOD OF MANUFACTURE

In the applicant's co-pending U.S. patent application Ser. No. 747,931, referred to above, there is a detailed discussion of the optical properties of the individual lenticules and methods of manufacturing lenticular film and screens suitable for use in connection with the invention. Such film and screens are also suitable for use in connection with the invention described herein. However, it is generally desirable for lenticules designed for use in the direct method to have a greater acceptance angle than those used in the indirect method. In the case of the direct method, the angular coverage of the photographic system is limited by and to the acceptance angle of the lenticules. On the other hand, in the case of the indirect method, the angular coverage of the system is governed solely by that of the camera lens. Thus, the angular coverage can be varied by the simple expedient of changing the lens. In most practical cases the angular coverage of the lens is in excess of the acceptance angle of the lenticules.

In the drawings:

FIG. 1 is a simplified diagram representing a piece of spherically lenticulated film recording an integral photograph.

FIG. 2 is a perspective view representing a piece of spherically lenticulated film recording an integral photograph.

FIG. 3 shows the piece of film in FIG. 2, viewed through the lenticules, subsequent to processing and being rotated through 180° in the image plane.

FIG. 4 represents a contact (emulsion-to-emulsion) print from the original photograph in FIG. 3.

FIG. 5 represents one type of print which can be obtained, by means of a two-stage transposition process, from the original photograph in FIG. 3.

FIG. 6 represents a further type of print which can be obtained, by means of a single transposition process, from the original photograph in FIG. 3.

FIGS. 7–10 constitute a series of diagrams illustrating the principle of the transposition process.

BASIC PRINCIPLE

FIG. 1 is a simplified diagram representing a piece of spherically lenticulated film (or screen-film combination) F recording an integral photograph of an object 0. As will be understood, the lenticules are shown greatly enlarged for the sake of clarity. It is to be assumed that the diagram represents a plan view, the left and right edges of the object being denoted by respectively $l$ and $r$, the corresponding edges of the film being denoted by $l'$ and $r'$. It will be observed that the aspect of the little image formed at the focus of each lenticule is dependent upon the location of the lenticule relative to the object, the aspect changing progressively from an extreme leftward view at the edge $l'$ of the film to an extreme rightward view at the edge $r'$. In addition to the single row of lenticules illustrated, there are, of course, further, parallel rows of lenticules which must be imagined as disposed in a plane normal to the surface of the drawing. Accordingly, the images recorded by the lenticular array differ in respect of both vertical and horizontal parallax.

Let us now imagine that the processed film is viewed by an observer located in front of the lenticules at some position such as that occupied by the object 0 in FIG. 1. Then the leftward aspects of the image will lie to his right and will be seen predominantly by his right eye, while the rightward aspects will lie to his left and will be seen predominantly by his left eye. In consequence, the integral image will be seen pseudoscopically. It will also appear upside down or inverted due to the inversion of each little image element resulting from the action of the associated lenticule. If, now, the piece of film be rotated through 180° in its own plane in order to compensate for this inversion, the integral image will be laterally inverted or perverted so that it will again be seen pseudoscopically. In short, in order that the completed photograph may be seen in stereoscopic relief, it is necessary for the individual picture elements to be appropriately reoriented or transposed. The situation is similar to that prevailing when a simple sterogram of stereoscopic pair of photographs has been recorded on a single plate or piece of film; the two views, or reproductions thereof, must be laterally transposed in order that they may be viewed in stereoscopic relief in a stereoscope.

In order that the integral image shall appear sharp, clear and undistorted, it is necessary to provide means for avoiding the formation of secondary or parasitic images. One such means is to arrange, in the manufacture of the lenticular film or other screen-film combination, for each lenticule to be isolated from the adjacent lenticules by a surrounding boundary composed of some opaque substance. This substance may take the form of a photographic emulsion, applied to the lenticulated surface in a thin layer so that it surrounds, without completely covering, the lenticules. The layer is then exposed to light and chemically developed in order to render it both black and opaque. As will be understood, this stage of the manufacturing process is carried out prior to application of the photo-recording layer or layers in those cases in which the lenticular screen in an integral part of the film. An opaque layer of this type is represented in FIG. 1 by the dark areas between the lenticules. As an alternative, or in addition, to the use of such a layer, it is possible to use a light-shield or hood extending outward from the edges of the film format.

THE TRANSPOSITION PROCESS

FIG. 2 depicts, greatly enlarged, a small piece of spherically lenticulated film recording an integral photograph of some three-dimensional subject represented by the large letter L, the general direction of the image-forming rays being indicated by the arrow. As will be noted, the piece of film is embossed with sixteen lenticules, in square array. The elementary images formed by the lenticules are numbered consecutively from 1 to 16. Images Nos. 1, 5, 9 and 13 represent the extreme leftward aspects of the subject; Nos. 4, 8, 12 and 16 represent the extreme rightward aspects; Nos. 1, 2, 3 and 4 represent the extreme upper aspects; Nos. 13, 14, 15 and 16 represent the extreme lower aspects, and Nos. 6, 7, 10 and 11 represent intermediate aspects, as will be understood. If the processed film, erected in order to compensate for the image-inversion due to the action of the lenticules, is now viewed through the embossed surface, the orientation of the elementary images will be as shown in FIG. 3; thus, the images will be laterally inverted or perverted, in consequence of which the integral image will be pseudoscopic. A further point, but one of minor consequence, is that the effect of vertical parallax will be exhibited in a manner opposite to that occurring in everyday visual experience. This is due to the interchanging of the horizontal rows of images as indicated in the drawing. A contact (emulsion-to-emulsion) print from the photograph onto a second, matching piece of lenticular film will bring about the result represented in FIG. 4. In this case the integral image will again be pseudoscopic since, although each individual elementary image is correctly oriented, the leftward aspects are located to the right of the observer, and the rightward aspects are located to his left. Vertical parallax will be exhibited in the same manner as by the arrangement shown in FIG. 3. Clearly, the ideal or perfect solution to this problem would be provided by (a) rotation of each elementary image through 180° within its own format, followed by (b) the making of a contact (emulsion-to-emulsion) print. This would yield the arrangement shown in FIG. 5, resulting in an integral image which is stereoscopic and free of error in respect of vertical parallax. However, as discussed at length in the applicant's co-pending U.S. patent application Ser. No. 747,931, it is a demonstrable fact that stereoscopic photographs which exhibit reversed vertical parallax are entirely acceptable to the observer; indeed, this type of defect will generally pass completely unnoticed. Thus, the arrangement of the elementary images which is represented in FIG. 6 also constitutes a satisfactory integram, as the resulting integral image is correctly oriented and stereoscopic. Means whereby integrams of the types represented in both FIGS. 5 and 6 can be produced constitute features of the present invention.

The transposition process with which the invention is concerned involves a sequential printing technique which can be followed with the aid of FIGS. 7 to 10. These four schematic drawings represent a time-spaced sequence of steps by which the original integral photograph in FIG. 3 can be used to print the integram represented in FIG. 6.

Referring to FIG. 7, the original photograph, denoted by O, is placed in emulsion-to-emulsion contact with the matching piece of lenticular material P on which the reproduction is to be printed, the left-hand column of lenticules on O being opposite the right-hand column of lenticules on P. The general direction of the printing light rays is indicated by the arrow A. The width of the strip of emulsion being exposed is restricted to the lenticular pitch distance; this can be accomplished by any suitable means, such as by admitting the light via a narrow slit, narrow cylindrical lens, or other convenient arrangement. Thus, in FIG. 7, just those images numbered 16, 12, 8 and 4 are printed. Referring now to FIG. 8, it will be noted that the photograph O has been transported to the left through a distance equal to the lenticular pitch, and that the film P has been transported to the right through the same distance; accordingly, the images numbered 15, 11, 7 and 3 can now be printed to the left of the column of images first reproduced. In FIG. 9 the two pieces of photographic material are depicted as having been again transported, in opposite directions, through a distance equal to the lenticular pitch, making it possible for the third column of images to be printed. FIG. 10 shows, finally, the printing of the fourth and last column of images, the completed integram now being of the type represented in FIG. 6.

The foregoing method of accomplishing the desired result has been selected for description simply as an example of the general principle involved. Various modifications of the technique are possible. The essential feature is that, between successive steps in the printing operation, there must be *relative* movement between the two films, plates or the like through a distance equal to *twice* the lenticular pitch. Accordingly, it is not necessary for both pieces of photographic material to be transported laterally. Thus, the piece denoted by P in the diagrams can be held stationary while that denoted by O, together with the printing aperture or equivalent, is transported laterally through twice the distance(s) indicated in the preceding explanation of the process. In the method preferred by the applicant, the piece of photographic material O, together with the printing aperture, is held stationary while the piece of photographic material P is transported.

If desired, the aforementioned relative movement between the two pieces of photographic material can be intermittent, printing light being admitted only during the stationary periods. However, the applicant considers it to be more practical and convenient for the movement to be continuous; the light source (e.g., electronic flash) is so synchronized with the film transport mechanism that a light pulse is emitted each time the film has moved through the prescribed distance. Provided that the duration of a pulse is a small fraction (e.g., one-hundredth) of the time taken by a lenticule to move past the printing aperture, no perceptible image-smear will result. As an alternative to electronic flash, a source of continuous illumination can be employed, the light being occulted intermittently by means of a synchronously driven shutter, or switched on and off by a synchronously operated commutator device.

By repeating the transposition process, but using a vertical scan instead of the original horizontal scan, an integram of the type shown in FIG. 10 (or FIG. 6) can be converted into one of the type shown in FIG. 5. However, for the reason previously indicated, this second scanning operation is considered to be unnecessary in the majority of practical applications of the process.

No basically new mechanism is required in order to accomplish the transposition process. The accurate transport mehanism which is necessary is available in, for example, ruling engines of the types used for producing fine-pitch line screens and diffraction gratings. (A portion of a typical ruling engine, modified for the manufacture of spherically embossed lenticular film, is illustrated in applicant's copending U.S. patent application Ser. No. 747,931.) To one skilled in the art, the provision of the necessary light-tight enclosure, film platens, illuminating means, etc., will not present difficulty.

Copies of integrams of the types represented in FIGS. 5 and 6 can be made by any of the techniques described in the patent application mentioned above.

Although a particular example of the method of the present invention has been described herein, it will be appreciated that modifications may be made. The following claims are intended to cover all such modifications which fall within the spirit and scope of the invention.

What is claimed is:

1. A printing method for making a reproduction on a matching piece of spherically lenticulated photosensitive material from an integral photograph, said integral photograph comprising a multiplicity of elementary spherical lenticules arranged in horizontal and vertical rows, and a corresponding multiplicity of images formed at the focus of the aforesaid lenticules, each such image representing a different aspect of the same scene, the relative positions of the elementary images being transposed during said printing method, which includes the following steps: generating relative movement between the integral photograph and the spherically lenticulated photosensitive material on which the reproduction is being made, admitting printing light through a narrow aperture extending across the width of the integral photograph and the photosensitive material on which the reproduction is being made, and in a direction at right-angles to that of said relative movement, to provide a series of successive exposures, the aperture being so positioned that each exposure results in the printing of a row of elementary images at the focus of the respective spherical lenticules on a narrow portion of the photosensitive material adjacent the portion on which a row of elementary images was printed during the preceding exposure, the said relative movement being so synchronized with the admittance of said printing light that an exposure is made each time the extent of the relative movement amounts to twice the width of one elementary image.

2. A two-stage printing method for making a reproduction from an integral photograph of the type defined in claim 1, said printing method comprising the following steps: performing a first transposition by the method defined in claim 1 to produce a reproduction of the type defined in said claim, processing said reproduction, and making a transposed copy of the processed reproduction by said printing method defined in claim 1, but with the axis of the second transposition at right-angles to the axis of the first transposition.

References Cited
UNITED STATES PATENTS 3,528,736  9/1970  Jones _____ 355—22
3,533,690  10/1970  De Montebello _____ 355—22 X SAMUEL S. MATTHEWS, Primary Examiner R. A. WINTERCORN, Assistant Examiner U.S. Cl. X.R.

352—46, 62